B. E. MARTIN.
TIRE SETTER.
APPLICATION FILED AUG. 4, 1910.

984,382.

Patented Feb. 14, 1911.
2 SHEETS—SHEET 1.

Witnesses
W. H. Rockwell
Ernest R. Hutchinson

Inventor
Barnet E. Martin
By Edson Bros.
Attorneys

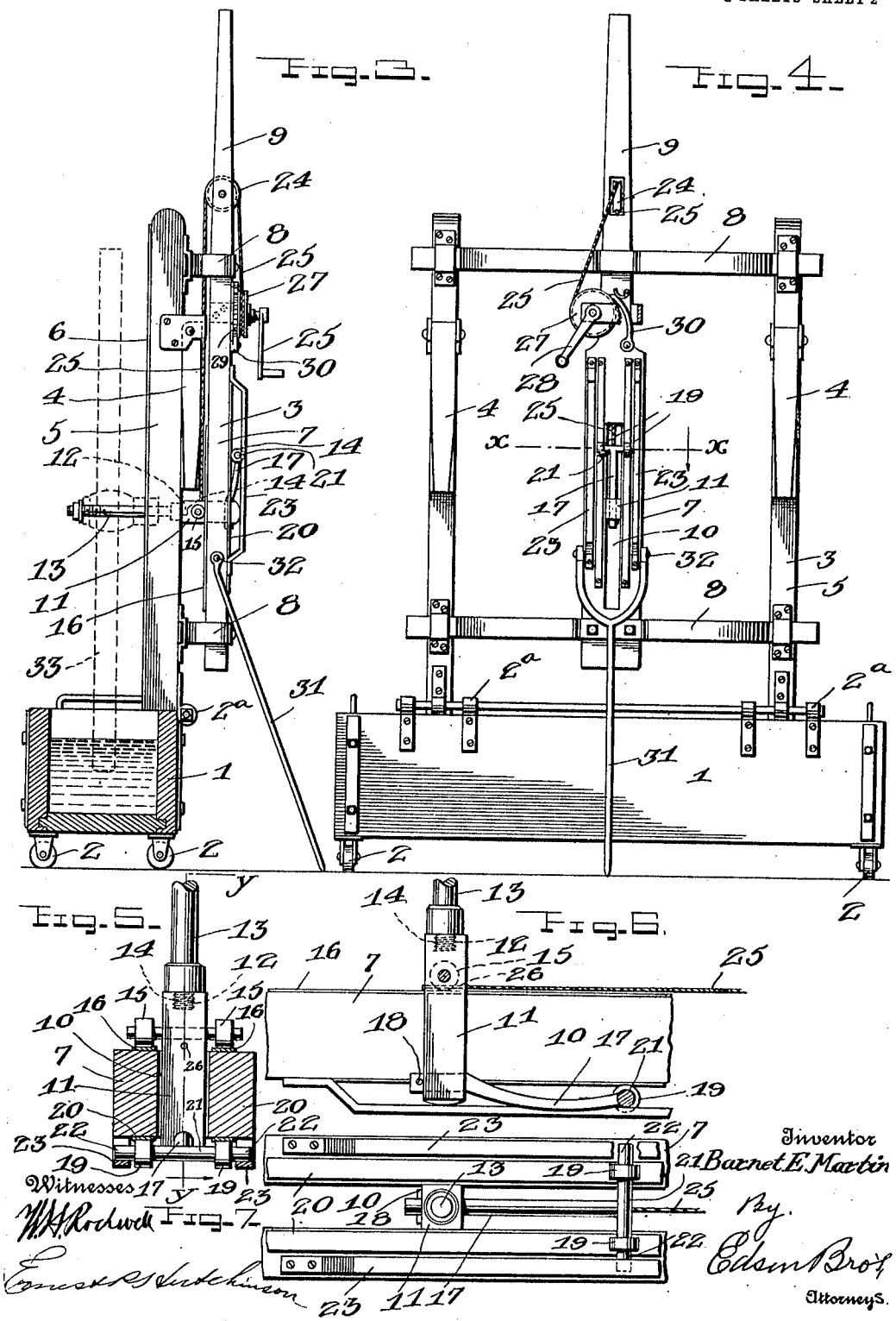

UNITED STATES PATENT OFFICE.

BARNET E. MARTIN, OF ST. MARYS, WEST VIRGINIA.

TIRE-SETTER.

984,382.  Specification of Letters Patent. Patented Feb. 14, 1911.

Application filed August 4, 1910. Serial No. 575,515.

*To all whom it may concern:*

Be it known that I, BARNET E. MARTIN, a citizen of the United States, residing at St. Marys, in the county of Pleasants and State of West Virginia, have invented certain new and useful Improvements in Tire-Setters; and I do hereby declare the following to be a full, clear, and exact description of the invention, such as will enable others skilled in the art to which it appertains to make and use the same.

My invention relates to tire setting machines of the class in which the tire is heated when placed on the wheel and afterward chilled and caused to contract by plunging it into water.

It is my aim to improve the construction of a machine of this kind whereby it may be more easily operated and the dangers of accidents and of the parts getting out of place or failing to operate properly are reduced to a minimum.

The invention consists in the features of construction and combinations of parts hereinafter described and specified in the claims.

Figure 1:
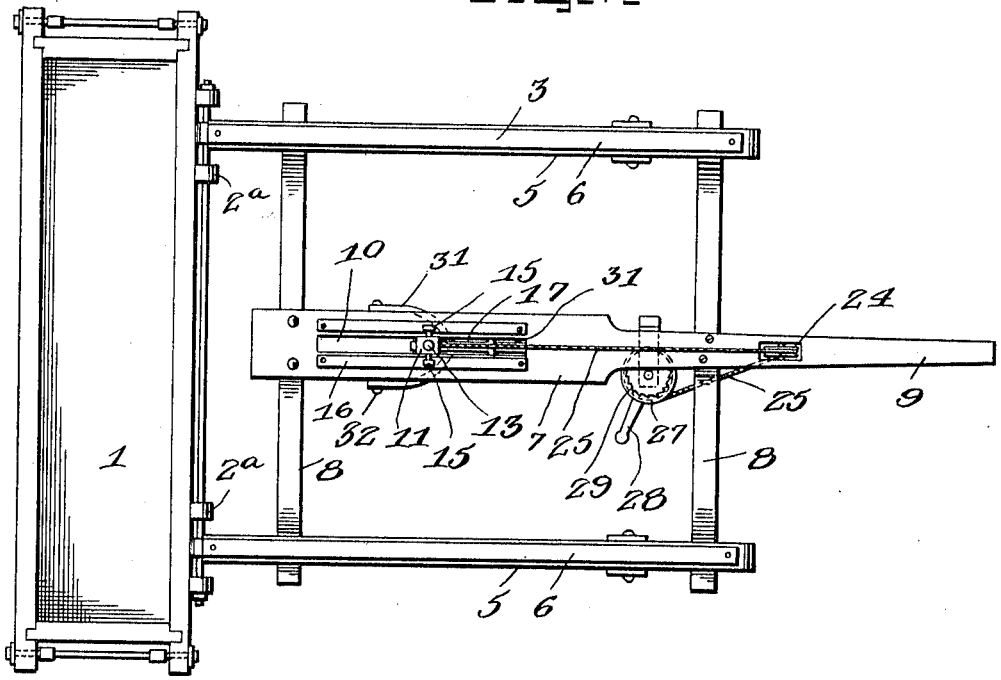
Figure 2:
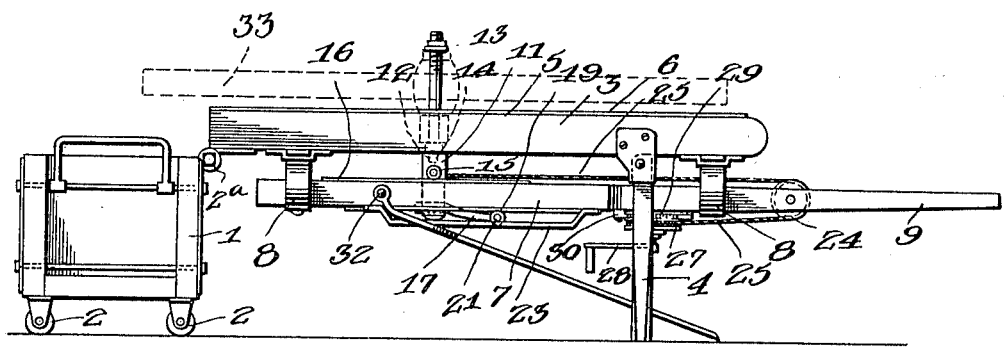

In the accompanying drawings, illustrating the preferred embodiment of my invention: Figure 1 is a plan view of the machine showing the frame, for holding the wheel, in its lowered or horizontal position. Fig. 2 is a side view of the machine as shown in Fig. 1. Fig. 3 is a side view showing the wheel carrying frame raised to vertical position, the trough being shown in section and a wheel illustrated in dotted lines. Fig. 4 is a rear elevation of the machine as shown in Fig. 3. Fig. 5 is an enlarged detailed section on the line x—x of Fig. 4. Fig. 6 is an enlarged section on the line y—y of Fig. 5, and Fig. 7 is an enlarged broken rear elevation of the slotted portion of the middle strip of the wheel-carrying frame.

Referring more particularly to the drawing, 1 designates the water trough which may be of any suitable construction and which is preferably supported on casters 2 so that the machine may be conveniently moved from one part of the shop to another as may be desired. To one of the upper lateral edges of the trough there is hinged, at 2ª, the wheel-carrying frame 3 which is provided with pivoted legs 4 adapted to support it in a horizontal position. Said frame comprises two parallel side strips 5, protected on their inner faces by metal plates 6, and a middle strip 7 arranged parallel to the side strips and connected thereto by cross pieces 8 which are slightly bowed to hold said middle strip a little below the plane of said side strips. Said middle strip has an extension 9 which serves as a handle for raising the frame from horizontal to vertical position.

The middle strip 7 is provided with a longitudinal slot 10 in the portion thereof arranged centrally of the frame 3. A block 11, having a screw-threaded socket 12, Fig. 5, is fitted to slide in said slot 10. The pin 13, on which the wheel is intended to be supported, is detachably connected to said block 11 by means of a screw-threaded stud 14 which engages the screw-threaded socket 12 in the block. Roller-bearings 15 are mounted on the inwardly projecting portion of the block 11, one of said rollers being arranged at each side of the block and engaging a metal track 16 secured to the face of the middle strip 7 at either side of the slot therein. To the end of the block which projects through the other side of the slot, there is connected a lever arm 17 extending parallel to the slot and away from the trough. Said lever arm may be connected to the block in any suitable manner. As here shown, one end thereof is mortised in the block and secured by means of a pin or key 18. The free outer end of the lever arm carries roller-bearings 19 similar to the roller-bearings 15 and engaging metal tracks 20 on the outer face of the strip 7. The ends of the axle 21 of the rollers 19 extend well beyond said rollers, as at 22, and are fitted above retaining strips 23 which hold said rollers in contact with the tracks 20.

A pulley 24 is set in a suitable socket in the handle or extending portion 9 of the middle strip. A cord or chain 25 is connected to the inwardly extending portion of the block 11, at 26, and is passed over said pulley and wound upon a drum 27 pivotally mounted on the middle strip 7. Said drum is equipped with a crank handle 28 and a ratchet surface 29, the latter being engaged by a spring pressed pawl 30.

A brace 31 is pivoted or hinged to the middle strip 7 of the wheel-carrying frame, as illustrated, and its pointed extremity 32 is adapted to engage the floor and support the frame in its raised position. The arrangement of the brace is such that it automatically checks the frame from falling back to its horizontal position as it is being raised to vertical position, and holds said frame rigidly when it reaches a vertical position. The legs 4 automatically fold themselves against the frame when the latter is raised and automatically extend themselves into position to support the frame when the latter is lowered to horizontal position.

In operation, the wheel, to which a tire is to be applied, is placed upon the frame in a horizontal position with the pin 13 extending through the hub. The wheel is illustrated in dotted lines, at 33, in Figs. 2 and 3. The heated tire is then adjusted over the wooden part of the wheel. This done, the frame is raised by the handle to a vertical position so that the wheel is suspended over the trough. The pawl 30 is then disengaged from the ratchet surface on the drum 27 and the block 11, carrying the pin 13, on which the wheel is supported, is lowered by means of the crank 28 until the tire enters the water in the trough. The wheel is then set in a revolving motion which completes the chilling process. The brace 31 being released, the frame is lowered again to horizontal position, the legs 4 dropping into place again by their own weight.

It will be noted that the pins for supporting the wheels are interchangeable so that various sizes of pins may be attached to the block 11 to suit different sizes of wheels. It will also be noted that the lever arm 17 furnishes a much better support for the wheel than if the block were directly engaged with the outer portion of the middle slotted strip of the frame. The roller-bearings insure easy movement of the block in both directions, and the retaining strips 23 prevent the lever arm, and roller-bearings carried thereby, from becoming disengaged or getting out of proper position.

I claim:

1. In a tire setting machine of the character described, the combination, with a water trough, of a wheel-carrying frame hinged thereto, means to support said frame in a vertical position, a slotted piece on said frame, a block mounted to slide in said slot and having means for supporting a wheel thereon, bearings for said block on the inner face of said slotted strip, a lever arm secured to the portion of the block extending from the slot on the outer face of said strip, said lever arm extending parallel to the slot and away from the trough, bearings on the extremity of said lever arm engaging the outer face of the slotted strip, and means to raise and lower said block in its slot for the purpose specified.

2. In a tire setting machine of the character described, the combination, with a water trough, of a wheel-carrying frame hinged thereto, means to support said frame in a vertical position, a slotted piece on said frame, a block mounted to slide in said slot and having means for supporting a wheel thereon, roller-bearings on the inner face of said slotted strip, a lever arm secured to the portion of the block extending from the slot on the outer face of said slotted strip, said lever arm extending parallel to the slot and away from the trough, roller-bearings on the extremity of said lever arm engaging the outer face of the slotted strip, and means to raise and lower said block in the slot for the purpose specified.

3. In a tire setting machine of the character described, the combination, with a water trough, of a wheel-carrying frame hinged thereto, means to support said frame in a vertical position, a slotted piece on said frame, a block mounted to slide in said slot and having means for supporting a wheel thereon, roller-bearings on the inner face of said slotted strip, a lever arm secured to the portion of the block extending from the slot on the outer face of said slotted strip, said lever arm extending parallel to the slot and away from the trough, roller-bearings on the extremity of said lever arm engaging the outer face of the slotted strip, the axle of said latter roller-bearings extending well beyond the same, retaining strips secured to the slotted strip and extending over said extensions of said axle whereby the rollers mounted on said axle are retained in contact with the outer face of the slotted strip, and means to raise and lower said block in the slot for the purpose specified.

In testimony whereof, I affix my signature, in presence of two witnesses.

BARNET E. MARTIN.

Witnesses:
J. P. HARMAN,
F. C. ABEL.